United States Patent [19]

Wellhausen

[11] Patent Number: 5,046,260

[45] Date of Patent: Sep. 10, 1991

[54] ELECTRONIC COMPASS

[76] Inventor: Heinz Wellhausen, Trockener Kamp 92, 3200 Hildesheim, Fed. Rep. of Germany

[21] Appl. No.: 397,439

[22] PCT Filed: Feb. 12, 1988

[86] PCT No.: PCT/EP88/00104

§ 371 Date: Jul. 13, 1989

§ 102(e) Date: Jul. 13, 1989

[87] PCT Pub. No.: WO88/06274

PCT Pub. Date: Aug. 25, 1988

[30] Foreign Application Priority Data

Feb. 17, 1987 [DE] Fed. Rep. of Germany ....... 3704934

[51] Int. Cl.[5] .............................................. G01C 17/28

[52] U.S. Cl. ....................................... 33/356; 33/361; 324/247

[58] Field of Search ..................... 33/361, 362, 355 R, 33/363 Q, 356, 352, 354; 324/247, 252, ; 364/457

[56] References Cited

U.S. PATENT DOCUMENTS

| | | | |
|---|---|---|---|
| 2,786,179 | 3/1957 | Arnold et al. | 324/247 |
| 3,628,254 | 12/1971 | Burmeister | 33/225 |
| 3,678,593 | 7/1972 | Baker et al. | 33/361 |
| 3,939,572 | 2/1976 | Erspamer | 33/361 |
| 3,952,420 | 4/1976 | Benjamin et al. | 33/361 |
| 4,179,741 | 12/1979 | Rossani | 33/356 |
| 4,398,353 | 8/1983 | Wesner | 33/363 Q |
| 4,413,424 | 11/1983 | Sasaki et al. | 33/361 |
| 4,546,551 | 10/1985 | Franks | 33/361 |
| 4,590,679 | 5/1986 | Livings et al. | 33/361 |
| 4,635,207 | 1/1987 | Payne | 324/247 |
| 4,750,349 | 6/1988 | Luitje | 33/361 |
| 4,767,988 | 8/1988 | Wilson | 33/355 R |
| 4,797,841 | 1/1989 | Hatch | 33/356 |
| 4,829,250 | 5/1989 | Rotier | 324/247 |

FOREIGN PATENT DOCUMENTS

| | | | |
|---|---|---|---|
| 0041258 | 4/1978 | Japan | 33/361 |
| 0040933 | 3/1980 | Japan | 33/355 R |
| 0605950 | 5/1978 | U.S.S.R. | 33/355 R |

*Primary Examiner*—William A. Cuchlinski, Jr.
*Assistant Examiner*—Alvin Wirthlin
*Attorney, Agent, or Firm*—Spensley Horn Jubas & Lubitz

[57] ABSTRACT

In an electronic compass having a plurality of sensors (1, 2, 3), each reacting to a component of the earth field (Hy), it is desired to prevent errors based on variations in the signal amplification and to improve the accuracy of measurement. In accordance with the invention, three identical sensors (1, 2, 3) are disposed at an angle of 120°. The compass may be used, in particular, for the navigation of vehicles.

14 Claims, 2 Drawing Sheets

ELECTRONIC COMPASS

FIELD OF THE INVENTION

The invention relates to an electronic compass with sensors, the output signal of which is dependent on the magnitude and direction of the magnetic fields permeating them and to which a coil for an exciter field, supplied with a clock voltage, is assigned.

BACKGROUND OF THE INVENTION

Such-electronic compass is known from the Technische Information [Technical Information]No. 840323 of the firm VALVO. The magnetoresistive sensors of the type KMZ 10A therein described are a passive component with a slide-wire bridge to which an operating voltage has been applied. The alignment of the bridge changes in relation to the magnitude of a magnetic field permeating the sensor in its longitudinal direction. Thus a voltage can be head off at the diagonal of the bridge, its sign depending on the direction and its magnitude on the magnitude of the incident magnetic field. In this connection it is known to dispose two such sensors offset from each other by 90° which, in this manner, evaluate the components of the incident magnetic field in two directions which are perpendicular to each other. By means of these two components, i.e. by the output voltages of the two sensors, the magnetic field is unequivocally defined as to its magnitude and direction.

Such sensors have an unavoidable offset voltage, i.e. a direct voltage component present in the output signal, which in particular is generated by an imperfect adjustment of the bridge and other environmental influences. At, for example, ±10–20 mV, this offset voltage is considerably greater than the signal voltage in the range of a few μV.

To compensate for this offset voltage, it is known to assign a coil to the sensors which is controlled by a clock voltage and which generates in the sensors a reversed exciter field oriented perpendicular to the direction of sensitivity. By means of this exciter field the direction of sensitivity of the sensors is periodically reversed with the frequency of the clock voltage. Then the output signal of the sensors is not a direct voltage but an alternating voltage having the frequency of the clock voltage. This makes it possible to separate the actual information signal from the offset voltage.

However, the information signals emitted by the sensors have to be amplified for further processing. On the one hand, their amplitude is insufficient for further processing of the signals. On the other hand, the ground field considerably changes regionally, so that the amplification must be correspondingly adapted and controlled. Because small differences in the amplification of the individual signals determine the result of the measurements and because in particular during the control of a plurality of amplification paths it is practically impossible to attain uniformity of the amplification for the signals of the two sensors, relatively large inaccuracies in measurement occur which limit the use of such magnetoresistive sensors.

SUMMARY OF THE INVENTION

It is an object of the invention to reduce such scattering and dependence on the adjustment of sensors and other parameters and to increase the accuracy of the compass equipped with such sensors.

This object is attained by means of the invention as described below.

The invention is based on the following realizations and considerations. When disposing three identical sensors at an angle of 120° from each other, the sum of the output signals of the three sensors exposed to the same magnetic field equals zero. This is based on the fact that the sum of the three instantaneous values of a sinusoidal voltage spaced at 120° is always zero. This is equivalent to the fact that the output signals of the three sensors, offset from each other by 120° and turned inside a constant magnetic field, always is zero, independent of the magnitude of this magnetic field, assuming that the three output signals offset by 120° have the same amplitude. Then, if the output signals of the three sensors are each scanned in short succession, their sum also is zero. The signals obtained in this manner are independent of each other, because they do not contain a direct voltage portion and therefore can be routed via a common alternating voltage amplifier. In an advantageous manner its amplification is of no critical importance, because the amplification does not affect the result of measuring, and the measuring result is only determined by the relationship of the amplitudes of the output signals of the sensors. Thus any change of the amplification, for example because of long term changes, the influence of temperature and control of the amplification, has no effect on the measurement results. The removal of the interfering offset voltage in the signal is a prerequisite for this. This is attained by means of a particularly advantageous circuit may be used, in particular.

Adjustment of the entire circuit arrangement thus becomes very simple, because essentially there is only one adjustment required for the different sensitivities of the three sensors. The effects of temperature are the same for the three sensors, thus influence the three output signals of the sensors evenly and, in an advantageous manner, do not effect the measuring results on which the relationship of these signals is based. By means of the compass according to the invention and the associated circuitry for the evaluation of these signals it is possible to achieve an accuracy of measurement of the direction of the earth field of approximately ½° and a resolution of approximately 1/10°, thus considerably higher values than with the conventional mechanical compass needle. The compass and the evaluation circuit are adaptable to various navigation systems and are suitable for various displays of the measurement results, for example in the form of a vector on a display screen or for the digital display of the direction of the earth magnetic field. By means of the invention the still existing shortcomings of the known sensors are compensated for to the largest extent and their range of use for the measurement of the earth magnetic field is extended. The invention is in particular usable with the so-called magnetoresistive sensors, the ohmic resistance of which depends on the magnitute and direction of the magnetic field penetrating them, such as they are described in the technical information of the firm VALVO mentioned above. Such sensors are particularly small and make possible a very tight structure of the entire compass.

In an embodiment of the invention which will be described below with reference to FIGS 2 and 3 the unwanted offset voltage is removed in a simple manner in that during the first half cycle of the clock voltage generating the exciter field, a condenser is charged up to the value of the voltage coming from the sensor and is, in the second half cycle, switched into the remaining signal path. The switched-in voltage is equal to the difference between the peak voltages of the two half cycles and the interfering offset voltage is removed in this manner. In further accordance with the invention, an alternating voltage amplifier used jointly for the three signal voltages of the sensors is always controlled in such a way that the signal with the greatest amplitude just reaches the full modulation range and that A/D converters which are, for example, disposed in the signal paths, are fully modulated. This results in a larger maximal resolution, because in this case the entire modulation range of the converter is used for at least the maximal signal and all phases of the converter are used for the digital signal, for example 256. This is possible because, as already stated, the amplification of the amplifier does not influence the measurement results. The control voltage for the amplifier which thus depends on the amplitude of the strongest signal of the three sensors, can also be used as an indication of the absolute magnitude of the earth field.

For all practical purposes, to determine the field direction two sensors offset against each other are sufficient, so that the three signals of the three sensors are per se redundant. Therefore, in accordance with a further feature of the invention, it is possible to form three results for the angle, which theoretically must agree. To increase the accuracy or to discard obvious wrong measurements, it is therefore possible to form an average value of the three results for display. The compass with the three sensors offset from each other and with the coil for the exciter field can be in the form of a compact unit, if desired a molded and encapsulated unit, because of which the position of the three sensors at 120° can be maintained with great accuracy.

The invention is described below in an exemplary embodiment by means of the drawings.

DETAILED DESCRIPTION OF THE PREFERRED EMBODIMENT

Figure 1:
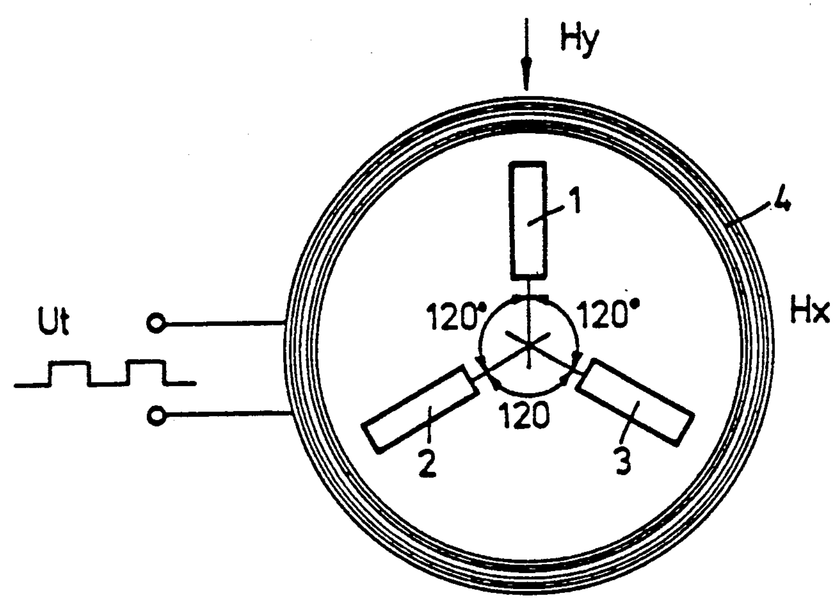
FIG. 1 shows the structure of the compass according to the invention in principle.

Three magnetoresistive sensors 1, 2, 3, for example of the type KMZ 10 A of the firm VALVO, are arranged at an angle of 120° to each other in FIG. 1. This means that the longitudinal axes of the three sensors 1, 2, 3, the associated field component Hy of which is to be evaluated, form an angle of 120° towards each other. The sensors 1, 2, 3 are surrounded by a coil 4, which is supplied with a clock voltage Ut. The coil 4 generates an exciter field Hx, which is oriented at right angles to Hy and which periodically reverses the polarity of the direction of sensitivity of the sensors 1, 2, 3. In accordance with the principle of the rotating field, the sum of the output signals of the sensors 1, 2, 3 is, because of the 120° offset and independent of the position and direction of the earth magnetic field Hy and of the spatial position of the compass, always equal to zero. Each one of the signals from the sensors 1, 2, 3 has, besides the information alternating voltage generated by the clock voltage Ut, an undesired offset voltage because of faulty adjustment of the resistor slide-wire bridge contained in the sensors or other irregularities.

Figure 2:
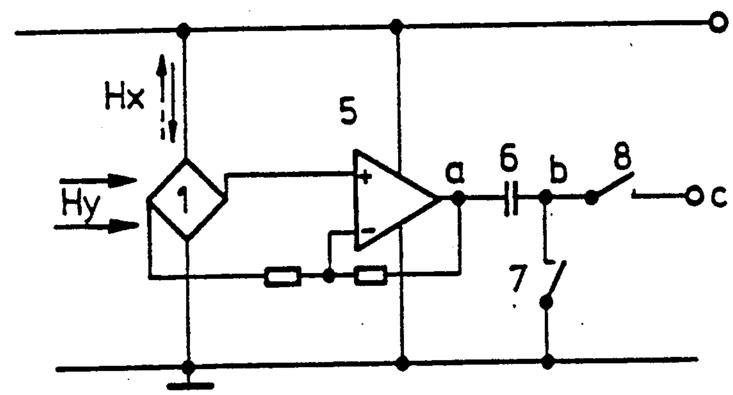
FIG. 2 shows a circuit for the elimination of the offset voltages.
Figure 3:
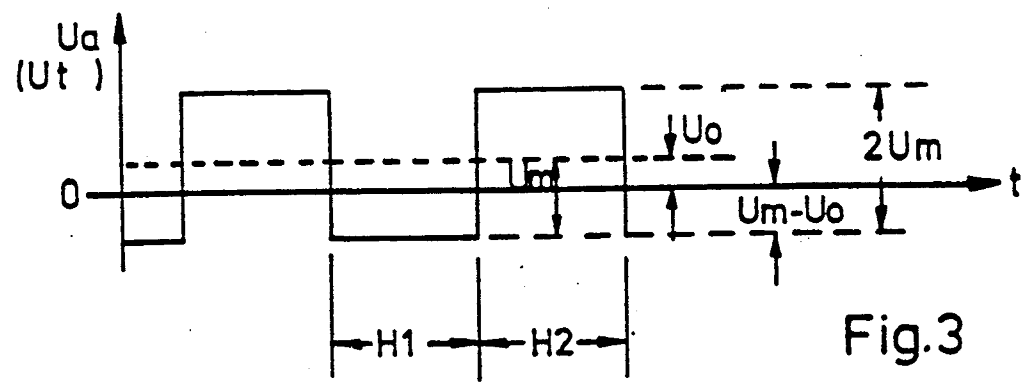
FIG. 3 shows the voltage gradient to explain FIG. 2.

FIGS. 2, 3 show a circuit by means of which the offset voltage in the output signals of a sensor, which is undesirable for the evaluation, can be eliminated. The sensor 1 is charged by the earth field component Hy and additionally by the exciter field component Hx, which is periodically reversed. The voltage Ua obtained in this manner reaches the differential amplifier 5 and thus appears at the output a. During the first half phase Hl of the voltage Ua (corresponding to Ut), the switch 7 is closed by a synchronous switching voltage. The condenser 6 quickly charges to the voltage at point a through the low-ohmic output a and the grounded point b. In accordance with FIG. 3 this voltage has the value Um-Uo, being the amplitude of the alternating voltage and Uo the value of the offset voltage. In the second half phase H2, the switch 7 is opened and the switch 8 is closed for a brief period for signal evaluation. The condenser 6 furthermore shows the voltage Um-Uo with the negative pole at point a. Since, on the other hand, the voltage at point a now $=\mathrm{Um}+\mathrm{Uo}$, a voltage of the value $$\mathrm{Uo}+\mathrm{Um}-(\mathrm{Uo}-\mathrm{Um})=2\ \mathrm{Um}$$

reaches the terminal c with the switch 8 closed. It is clear that the disturbing offset voltage Uo has been eliminated from the signal voltage at point c. Therefore the signal at point c is supplied to the subsequent evaluation circuit without the offset voltage. A corresponding circuit is provided in the same form for the two other sensors 2, 3. The amplifier 5 is a direct voltage amplifier with small amplification. In general it is used for forming the low-ohmic output a for the charge change of the condenser 6 and to make possible an adjustment to the different sensitivities of the three sensors 1, 2, 3.

Figure 4:
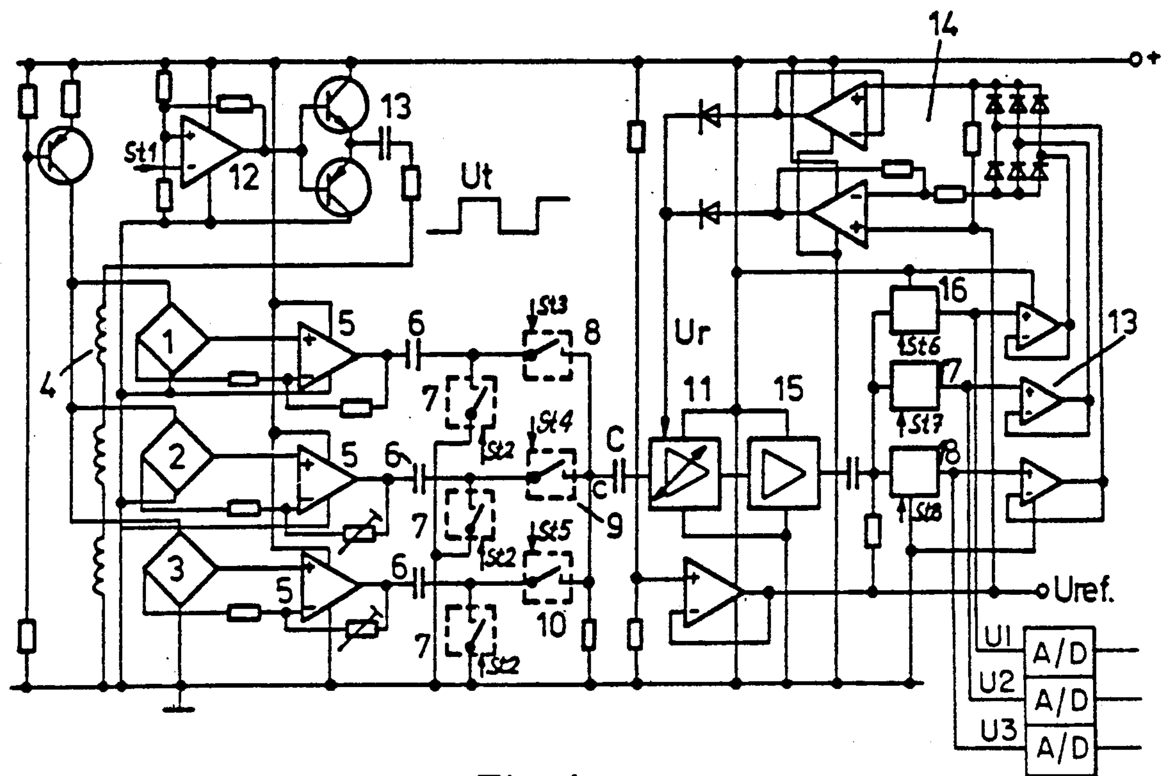
FIG. 4 shows the complete circuit for the evaluation of the signals of the three sensors.
Figure 5:
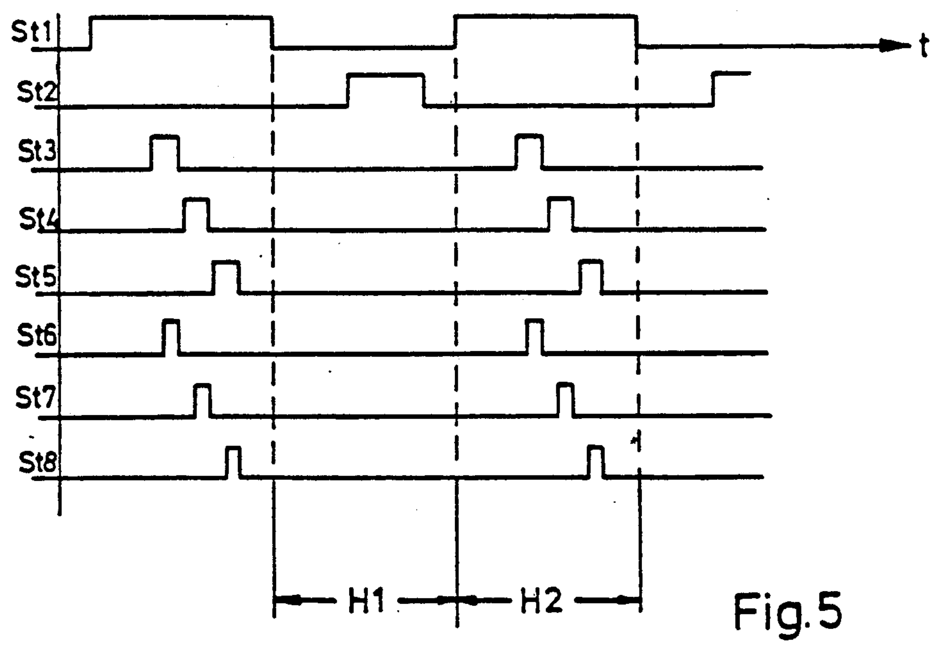
FIG. 5 shows voltage diagrams to explain the circuit in accordance with FIG. 4.

FIG. 4 illustrates a complete circuitry for the evaluation of the signal voltages generated in the sensors 1, 2, 3, which the circuit in accordance with FIG. 2 contains in triplicate. The function is explained by means of the graphs in accordance with FIG. 5. The voltage Stl generates the clock voltage Ut via the amplifier 12 and the final stage 13, which feeds the coil 4 in the manner described and thus generates the exciter field Hx. The three switches 7 are each simultaneously closed during the first half cycle H1 of the voltage St1, and thus also of Ut, by the pulse St2 and effect the rapid charging of the condensers 6 to the output voltage of the amplifiers 5 in accordance with FIG. 2. The switches 8, 9, 10 operate the same as the switch 8 in FIG. 2, however, during the second cycle H2 they are briefly made conductive by the pulses St3, St4, St5 in a time sequence. For this reason time-sequenced signals are generated at point c, which represent the output signal of the three sensors 1, 2, 3, and which are free of the offset voltage. The generation of the three signals in time sequence is permissible, because the output signals of the three sensors 1, 2, 3 do not change in time, at least during the short period involved These sequential signals reach, via an alternating voltage coupling with direct current separation provided by a condenser C, the alternating voltage amplifier 11 common for all three signals, which is controlled by the control voltage Ur. The sequential signals reach in the same way, via a further amplifier 15, the inputs of the three sample and hold circuits 16, 17, 18. The sample and hold circuits 16, 17, 18 are synchronously activated by the pulses St6, St7, St8 for signal sampling, but they are temporally displaced by the amount of the operating time of the amplifiers in relation to the pulses St3, St4, St5. Thus, each of the three signals is stored as it appears in the circuit 16, 17, 18 and each is maintained until the following pulse, i.e. the following second half cycle H2 of the voltage St1. In this way the sequential signals, each only appearing for a short time, are converted back at the output of the amplifier 15 into constantly connected, simultaneous signals. The phases 16, 17, 18 provide the three signals U1, U2, U3. It is possible to determine the direction of the earth magnetic field, to which the compass is subjected, from the ratio of two of these voltages, for example U1 and U2 or U1 and U3 or U2 and U3. These signals represent the measuring result. They may represent, for example, the direction of the measured earth magnetic field in the form of a vector on a display screen or, in digital form as numerical values, the direction of the earth magnetic field in degrees and minutes The control voltage Ur for the amplifier 11 is generated by the amplifiers 14 from the signals U1, U2, U3. This control of the amplification is performed in such a way that the amplifier 11 is fully modulated by the signal at point c with the largest amplitude. A constant DC voltage U ref is supplied to the circuit for adjusting the operating point at the signal processing stages. Because of this constant, full modulation, A/D converters in the signal path are fully modulated with the largest amplitude, because of which the signal-to-noise ratio and the possibility of errors are reduced. However, the amplification affecting the signal is reduced. But this does not make for an error in the measuring results, because only the ratio of the amplitudes of the signals U1, U2, U3 is evaluated in the evaluation circuit, and not their absolute amplitude.

Thus the value of the control voltage Ur depends on the largest amplitude of the earth field Hy evaluated by a sensor, in the sense that with decreasing amplitude the amplification of the amplifier 11 is increased. For this reason, the control voltage Ur can also be used to indicate the absolute value of the effective earth field detected at this time by the compass.

To determine the direction of the earth field, two signals are, per se, sufficient, so that the generated signal U1, U2, U3 is, per se, redundant. For this reason it is possible to obtain a total of three different measuring results for the direction of the earth field from these signals, namely by a comparison of U1 and U2, of U1 and U3 and of U2 and U3. The average value of these three measuring results can then be used for display, which increases accuracy and allows recognition of possible large mistakes by means of too large deviations between the three results. The sum of the three signals U1, U2, U3 also always is zero. A deviation from this fundamental requirement of the circuit can also be separately determined, recognized as error and used to eliminate the result. Evaluation of the signals U1, U2, U3 preferably takes place in a computer which generates the signal desired for the respective display, for example the display of a pointing arrow on a display screen or signals for the numerical read-out of the field direction.

The invention is usable in all vehicles having navigation systems, such as aircraft, ships, automobiles with traffic detectors and devices in which the simple and error-free determination of the effective earth field is useful or necessary.

What is claimed is:

1. An electronic compass comprising:

three magnetic field sensors disposed to be traversed by a primary magnetic field at an angle of 120° to one another to prevent errors caused by variations in signal amplification, and a coil disposed for producing an exciter magnetic field which traverses the sensors such that each sensor produced an output signal which is dependent on the magnitude and direction of the magnetic fields traversing the sensor and which may contain a dc offset voltage;

a clock voltage source connected for supplying to said coil a clock voltage which causes the polarity of the exciter magnetic field to be periodically reversed, each cycle of the clock voltage being composed of a first half cycle during which the exciter magnetic field as a first polarity and a second half cycle during which the exciter magnetic field has a second polarity opposite to the first clarity;

offset voltage removing means connected for receiving the output signal from each sensor and for producing three corrected output signals corresponding to the sensor output signals with the dc offset voltage removed from each sensor output signal;

a primary signal amplifier common to said corrected output signals, and having an input, a signal amplification path and an output, and means providing alternating voltage coupling with direct current separation in said amplification path;

signal combining means connected between said offset voltage removing means and said amplifier signal amplification path for supplying signals derived from the corrected output signals of said sensors in time succession during each second half cycle of the clock voltage such that the signal supplied to said amplifier input is based on the corrected output signal of only one sensor at any given time; and signal separating means connected to said amplifier output for transforming the signal at said amplifier output into three simultaneous, continuous signals each based on the corrected output signal from a respective sensor.

2. A compass in accordance with claim 1 wherein said signal separating means comprise three sample and hold circuits.

3. A compass in accordance with claim 1 wherein for display of the direction of the primary magnetic field, three values are derived each on the basis of a perspective pair of the three continuous signals, and the average of the three values is determined.

4. A compass in accordance with claim 1 further comprising means for controlling the amplification of said amplifier for causing said amplifier to always be fully modulated by the largest amplitude signal supplied to said amplifier signal amplification path.

5. A compass in accordance with claim 4 further comprising three analog/digital converters each connected to convert a respective continuous signal into a digital form, and wherein said means for controlling the amplification of said amplifier are operative for causing all of said converters to be approximately fully modulated.

6. A compass in accordance with claim 4 wherein said means for controlling the amplification of said amplifier produce a control signal which is supplied to said amplifier and which provides an indication of the magnitude of the primary magnetic field.

7. A compass in accordance with claim 1 further comprising:

sensor signal processing means connected between said sensor and said signal combining means, said signal processing means being composed of three circuit units each associated with a respective sensor, each circuit unit comprising a ground point, a differential amplifier having an input connected to receive the output signal from the respective sensor, and an output, and a condenser having first and second terminals, with said first terminal being connected to said differential amplifier output; and switching means connected to said condenser of each said circuit unit and operative for connecting said second terminal to he ground point during each first half cycle of clock voltage and for connecting said second terminal to said signal combining means during each second half cycle of the clock voltage.

8. A compass in accordance with claim 7 wherein said switching means are operative for simultaneously connecting said second terminals of said condensers of said three circuit units to their associated ground point during each first half cycle and for connecting said second terminals of said condensers to said signal combining means in time sequence during each said second half cycle.

9. An electronic compass comprising:

three magnetic field sensors disposed to be traversed by a primary magnetic field at an angle of 120° to one another to prevent errors caused by variations in signal amplification, and a coil disposed for producing an exciter magnetic field which traverses the sensors such that each sensor produced an output signal which is dependent on the magnitude and direction of the magnetic fields traversing the sensor;

a clock voltage source connected for supplying to said coil a clock voltage which causes the polarity of the exciter magnetic field to be periodically reversed, each cycle of the clock voltage being composed of a first half cycle during which the exciter magnetic field has a first polarity and a second half cycle during which the exciter magnetic field has a second polarity opposite to the first polarity;

a primary signal amplifier common to said corrected output signals, and having an input, a signal amplification path and an output, and means providing alternating voltage coupling with direct current separation in said amplification path;

signal combining means connected before said amplifier signal amplification path for supplying signals derived from the output signals of said sensor in time succession during each second half cycle of the clock voltage such that the signal supplied to said amplifier input is based on the output signal of only one sensor at any given time; and signal separating means connected to said amplifier output for transforming the signal at said amplifier output into three signals each based on the corrected output signal from a respective sensor;

wherein for display of the direction of the primary magnetic field, three values are derived each on the basis of a respective pair of the three signals provided by said signal separating means, and the average of the three values is determined.

10. An electronic compass comprising:

three magnetic field sensor s disposed to be traversed by a primary magnetic field at an angle of 120° to one another to prevent errors caused by variations in signal amplification, and a coil disposed for producing an exciter magnetic field which traverses the sensors such that each sensor produce an output signal which is dependent on the magnitude and direction of the magnetic fields traversing the sensor;

a clock voltage source connected for supplying to said coil a clock voltage which causes the polarity of the exciter magnetic field to be periodically reversed, each cycle of the clock voltage being composed of a first half cycle during which the exciter magnetic field has a first polarity and a second half cycle during which the exciter magnetic field has a second polarity opposite to the first polarity;

a primary signal amplifier common to said corrected output signals, and having an input, a signal amplification path and an output, and means providing alternating voltage coupling with direct current separation in said amplification path;

signal combining means connected before said amplifier signal amplification path for supplying signals derived from the output signals of said sensors in time succession during each second half cycle of the clock voltage such that the signal supplied to said amplifier input is based on the output signal of only one sensor at any given time;

signal separating means connected to said amplifier output for transforming the signal at said amplifier output into three signals each based on the corrected output signal from a respective sensor; and means for controlling the amplification of said amplifier for causing said amplifier to always be fully modulate by the largest amplified signal supplied to said amplifier signal amplification path.

11. A compass in accordance with claim 10 comprising three analog/digital converters each connected to convert a respective continuous signal into digital form, and wherein said means for controlling the amplification of said amplifier are operative for causing all of said converters to be approximately fully modulated.

12. A compass in accordance with claim 10 wherein said means or controlling the amplification of said amplifier produce a control signal which is supplied to said amplifier and which provides an indication of the magnitude of the primary magnetic field.

13. An electronic compass comprising:

three magnetic field sensors disposed to be traversed by a primary magnetic field at an angle of 120° to one another to prevent errors caused by variations in signal amplification, and a coil disposed for producing an exciter magnetic field which traverses the sensors such that each sensor produced can output signal which is dependent on the magnitude and direction of the magnetic fields traversing the sensor;

a clock voltage source connected for supplying to said coil a clock voltage which causes the polarity of the exciter magnetic field to be periodically reversed, each cycle of the clock voltage being composed of a first half cycle during which the exciter magnetic field as a first polarity and a second half cycle during which the exciter magnetic field has a second polarity opposite to the first clarity;

a primary signal amplifier common to said corrected output signals, and having an input, a signal amplification path and an output, and means providing alternating voltage coupling with direct current separation in said amplification path;

signal combining means connected before said amplifier signal amplification path for supplying signals derived from the output signals of said sensors in time succession during each second half cycle of the clock voltage such that the signal supplied to said amplifier input is based on the output signal of only one sensor at any given time;

signal separating means connected to said amplifier output for transforming the signal at said amplifier output into three signals each based on the corrected output signal from a respective senor;

sensor signal processing means connected between said sensors and said signal combining means, said signal processing means being composed of three circuit units each associated with a respective sensor, each circuit unit comprising a ground point, a differential amplifier having an input connected to receive the output signal from the respective sensor, and an output, and a condenser having first and second terminals, with said first terminal being connected to said differential amplifier output; and switching means connected to said condenser of each said circuit unit and operative for connecting said second terminal to the ground point during each first half cycle of clock voltage and for connecting said second terminal to said signal combining means during each second half cycle of the clock voltage.

14. A compass in accordance with claim 13 wherein said switching means are operative for simultaneously connecting said second terminals of said condensers of said three circuit units to their associated ground points during each first half cycle and for connecting said second terminals of aid condensers to said signal combining means in time sequence during each said second half cycle.

* * * * *